(12) United States Patent
Jung et al.

(10) Patent No.: US 8,948,130 B2
(45) Date of Patent: Feb. 3, 2015

(54) ZONE SWITCHING METHOD IN A BROADBAND WIRELESS ACCESS SYSTEM HAVING REGARD TO SECURITY ASSOCIATION AND DEVICE FOR SAME

(75) Inventors: In Uk Jung, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 166 days.

(21) Appl. No.: 13/634,211

(22) PCT Filed: Mar. 14, 2011

(86) PCT No.: PCT/KR2011/001766
§ 371 (c)(1),
(2), (4) Date: Sep. 11, 2012

(87) PCT Pub. No.: WO2011/112058
PCT Pub. Date: Sep. 15, 2011

(65) Prior Publication Data
US 2013/0010762 A1  Jan. 10, 2013

Related U.S. Application Data

(60) Provisional application No. 61/313,637, filed on Mar. 12, 2010.

(30) Foreign Application Priority Data

Mar. 14, 2011 (KR) .................. 10-2011-0022321

(51) Int. Cl.
*H04W 4/00* (2009.01)
*H04W 12/06* (2009.01)
*H04W 36/00* (2009.01)

(52) U.S. Cl.
CPC .......... *H04W 12/06* (2013.01); *H04W 36/0038* (2013.01)
USPC ........................ 370/331; 455/436; 370/252

(58) Field of Classification Search
None
See application file for complete search history.

(56) References Cited

U.S. PATENT DOCUMENTS 6,587,680 B1    7/2003 Ala-Laurila et al.
8,432,870 B2 *  4/2013 Maheshwari et al. ........ 370/331
(Continued)

FOREIGN PATENT DOCUMENTS

KR    10-2007-0108038    11/2007
KR    10-2009-0039593     4/2009
(Continued)

OTHER PUBLICATIONS

Yang, et al., "Zone switching operations in 16e/16m mixed mode operations," IEEE 802.16 Broadband Wireless Access Working Group, IEEE C802.16m-09/0532, Mar. 2009, 3 pages.

*Primary Examiner* — Bob Phunkulh
(74) *Attorney, Agent, or Firm* — Lee, Hong, Degerman, Kang & Waimey

(57) ABSTRACT

The present invention relates to a wireless access system, and more particularly, to a method for supporting security during a handover performance through a zone switch and to a device performing same. According to one embodiment of the present invention, switching a zone by a terminal in a broadband wireless access system comprises the following steps: creating at least one service flow in a first zone that supports the legacy mode of a base station; receiving at the base station a first message, which indicates a zone switch to a second zone that supports an advanced mode; and performing the zone switch, wherein performing the zone switch may further comprise a step for receiving from the second zone a second message, which includes security association information that indicates the security association applied to at least one service flow in the second zone.

15 Claims, 5 Drawing Sheets

(56) References Cited

U.S. PATENT DOCUMENTS

| | | | |
|---|---|---|---|
| 8,638,777 B2* | 1/2014 | Park et al. | 370/350 |
| 2009/0310533 A1 | 12/2009 | Zheng et al. | |
| 2010/0002653 A1* | 1/2010 | Agiwal et al. | 370/331 |
| 2010/0008328 A1 | 1/2010 | Maheshwari et al. | |
| 2010/0069073 A1* | 3/2010 | Chen et al. | 455/437 |
| 2010/0098025 A1* | 4/2010 | Chen et al. | 370/331 |
| 2010/0172325 A1* | 7/2010 | Jung et al. | 370/331 |
| 2010/0228967 A1 | 9/2010 | Hahn et al. | |
| 2011/0096927 A1* | 4/2011 | Baek et al. | 380/270 |

FOREIGN PATENT DOCUMENTS

| | | |
|---|---|---|
| WO | 2009/132255 | 10/2009 |
| WO | 2009/145587 | 12/2009 |
| WO | 2009/148261 | 12/2009 |

* cited by examiner

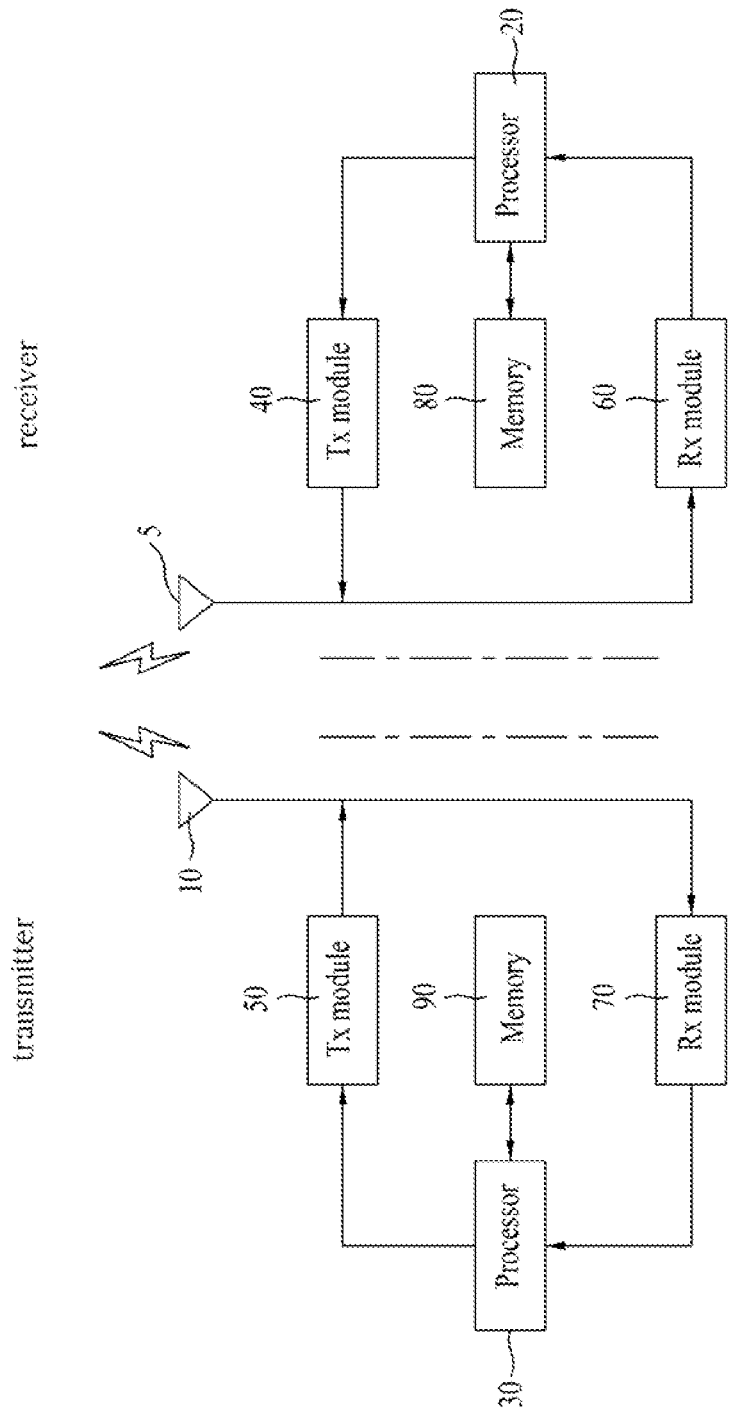

ZONE SWITCHING METHOD IN A BROADBAND WIRELESS ACCESS SYSTEM HAVING REGARD TO SECURITY ASSOCIATION AND DEVICE FOR SAME

CROSS-REFERENCE TO RELATED APPLICATIONS

This application is the National Stage filing under 35 U.S.C. 371 of International Application No. PCT/KR2011/001766, filed on Mar. 14, 2011, which claims the benefit of earlier filing date and right of priority to Korean Patent Application No. 10-2011-0022321, filed on Mar. 14, 2011, and also claims the benefit of U.S. Provisional Application Ser. No. 61/313,637, filed on Mar. 12, 2010, the contents of which are all hereby incorporated by reference herein in their entirety.

TECHNICAL FIELD

The present invention relates to a radio access system, and more particularly, to a method and apparatus for supporting security upon handover through zone switching.

BACKGROUND ART

Handover (HO) indicates that a mobile station (MS) moves from an air interface of one base station to an air interface of another base station. Hereinafter, a handover procedure of a general IEEE 802.16 system will be described.

In an IEEE 802.16 network, a serving base station (SBS) may broadcast neighboring base station information through a neighboring advertisement (MOB_NBR-ADV) message in order to inform a mobile station (MS) of information (topology) about a basic network configuration.

The MOB_NBR-ADV message includes system information of a serving base station and neighboring base stations, for example, preamble indexes, frequencies, HO optimization degrees, downlink channel descriptor (DCD)/uplink channel descriptor (UCD) information, etc.

DCD/UCD information includes information necessary to enable an MS to perform information exchange in downlink and uplink. For example, DCD/UCD information includes HO trigger information, information about a medium access control (MAC) version of a base station, media independent handover (MIH) capability information, etc.

A general MOB_NBR-ADV message includes only information about neighboring base stations of an IEEE 802.16e type. Information about base stations of the types other than an IEEE 802.16e type may be broadcast to MSs through a service identity information advertisement (SII-ADV) message. Accordingly, an MS may request an SBS to transmit the SII-ADV message so as to acquire information about base stations of heterogeneous networks.

A procedure for performing handover by an MS, which acquires information about neighboring base stations using the above-described method, in an IEEE 802.16 network will be described in greater detail.

FIG. 1 is a diagram showing an example of a handover procedure which may be performed in an IEEE 802.16 system.

Referring to FIG. 1, first, a mobile station (MS) may access a serving base station (SBS) so as to perform data exchange (S101).

The SBS may periodically broadcast information about neighboring base stations (BSs) thereof to the MS through an MOB_NBR-ADV message (S102).

The MS may begin to scan candidate HO BSs using an HO trigger condition while communicating with the SBS. The MS may transmit a handover request (MOB_MSHO-REQ) message so as to request the SBS to perform a handover procedure if a handover condition exceeds, for example, a predetermined hysteresis margin value (S103).

The SBS may inform candidate HO BSs included in the MOB_MSHO-REQ message of the handover request from the MS through an HO-REQ message (S104).

The candidate HO BSs may take precautions for the MS which requests handover and transmit information associated with handover to the SBS through an HO-RSP message (S105).

The SBS may transmit information associated with handover acquired from the candidate HO BSs through the HO-RSP message to the MS through a handover response (MOB_BSHO-RSP) message. The MOB_BSHO-RSP message may include information for performing handover, such as an action time for performing handover, a handover identifier (HO-ID) and a dedicated HO CDMA ranging code (S106).

The MS may determine one target BS among the candidate HO BSs based on information included in the MOB_BSHO-RSP message received from the SBS. Then, the MS may attempt to perform ranging by transmitting CDMA code to the determined target BS (S107).

The target BS which receives the CDMA code may transmit information as to whether or not ranging is successfully performed and physical correction values to the MS through a ranging response (RNG-RSP) message (S108).

Next, the MS may transmit a ranging request (RNG-REQ) message for authentication to the target BS (S109).

The target BS which receives the ranging request message of the MS may provide system information available to the BS, such as a connection identifier (CID), to the MS through a ranging response message (S110).

If the target BS successfully completes authentication of the MS and sends all update information, the target BS may inform the SBS of the MS that handover is successfully performed through a handover completion (HO-CMPT) message (S111).

Thereafter, the MS may exchange information with the target BS which performs handover (S112).

The above-described handover procedure is performed between the MS and the BS which follow the IEEE 802.16e standard (WirelessMAN-OFDMA R1 Reference System). Hereinafter, in the present specification, for convenience, a system to which a general technology including the IEEE 802.16e standard is applied is referred to as a "legacy system". An MS to which the legacy technology is applied is referred to as a "WirelessMAN-OFDMA R1 Reference MS", an "YMS (Yardstick MS)" or a "legacy MS", and a BS to which the legacy technology is applied is referred to as a "legacy BS", a "R1 BS", a "WirelessMAN-OFDMA R1 Reference BS" or an "YBS (Yardstick BS)".

An MS to which an advanced technology including the IEEE 802.16m standard (WirelessMAN-OFDMA Advanced System) is applied is referred to as an "advanced MS" or an "AMS", and a BS to which the advanced technology is applied is referred to as an "advanced BS" or an "ABS". In addition, an operation mode of an MS or a BS to which the advanced technology is applied is referred to as an "advanced mode".

It is assumed that an AMS accesses a YBS so as to receive a service from the YBS and an ABS (WirelessMAN-OFDMA R1 Reference System/WirelessMAN-OFDMA Advanced co-existing system) supporting both an AMS and a YMS exists adjacent to the YBS.

The YBS has only a legacy zone (LZone) having a physical channel frame structure applied to a legacy system. It is assumed that an ABS has only an advanced MS support zone (MZone: 16 M zone) having a physical channel frame structure applied to an advanced system if only an AMS is supported (WirelessMAN-OFDMA advanced system only). An ABS (WirelessMAN-OFDMA Reference System/WirelessMAN-OFDMA Advanced co-existing System legacy supportive) which supports both an AMS and an YMS has both a legacy zone (LZone) and an advanced MS support zone (MZone), which are divided in time units, for example, is divided using time division duplex (TDD) in frame units or subframe units, in uplink and downlink.

It is assumed that the AMS may receive services from both the ABS and the YBS. That is, it is assumed that the AMS may receive a service through any one of the new MS support zone and the legacy zone and may perform both a handover procedure defined in the legacy system and a handover procedure defined in the advanced system.

Generally, in order to perform handover from a serving YBS to an ABS supporting both an AMS and a YMS, the AMS may enter a legacy zone of the ABS and continue to receive a service in the legacy zone or perform zone switching to an advanced MS support zone. In addition, the AMS may perform handover by immediately performing zone switching to an advanced MS support zone without entering the legacy zone of the ABS.

Zone switching will now be described in detail. Zone switching refers to a procedure of enabling an AMS which operates in an LZone to operate in a resource region of an MZone in the case in which there are an LZone and an MZone divided using a TDD scheme in one carrier. That is, an IEEE 802.16e MAC operation is switched to an IEEE802.16m MAC operation. Zone switching includes movement of an AMS from an MZone to an LZone.

However, in order to guarantee service continuity when zone switching is performed, context mapping of a service flow identifier and mapping of a security association identifier (SAID) should be performed. In a general IEEE 802.16e/m system, context mapping of a service flow identifier may be automatically performed such that a first transport connection ID (CID) is mapped to a flow identifier (FID) in ascending order. However, since the type of a security association identifier (SAID) defined in the standard of the MZone and the type of an SAID defined in the standard of the LZone are different, the SAID may not be automatically mapped.

Accordingly, it is necessary to define a method of enabling a BS to inform an MS of how an SAID is mapped to a service flow identifier upon zone switching and to define a mapping rule of an SAID.

DISCLOSURE

Technical Problem

An object of the present invention is to provide a method of deciding security association to be applied to each service flow in a switched zone upon zone switching of a mobile station (MS).

The technical problems solved by the present invention are not limited to the above technical problems and other technical problems which are not described herein will become apparent to those skilled in the art from the following description.

Technical Solution

The object of the present invention can be achieved by providing a method of performing zone switching at a mobile station (MS) in a broadband radio access system, the method including generating at least one service flow in a first zone supporting a legacy mode of a base station (BS), receiving a first message indicating zone switching to a second zone supporting an advanced mode at the BS from the first zone, and performing zone switching, wherein the performing zone switching includes receiving, from the second zone, a second message including security association (SA) information indicating SA applied to the at least one service flow in the second zone.

At this time, with respect to each of the at least one service flow, any one of an SAID 0 with null SA and an SAID 1 for protecting confidentiality and integrity may be applied in the legacy mode, and any one of the SAID 0, the SAID 1 and an SAID 2 for protecting confidentiality may be applied in the advanced mode.

The SA information may include a bitmap indicating to which of the at least one service flow the SAID 2 is applied.

The method may further include applying SA to the at least one service flow according to the SA information and a predetermined SA mapping rule so as to perform data exchange with the second zone, and the predetermined SA mapping rule may set mapping of the SAID 0 or the SAID 1 in the second zone in consideration of at least one of SA in the first zone of the at least one service flow, management connection or unicast connection.

In another aspect of the present invention, there is provided a method of supporting zone switching of a mobile station (MS) at an advanced base station (ABS) supporting a legacy mode in a broadband radio access system, the method including generating at least one service flow with respect to the MS in a first zone supporting the legacy mode, transmitting a first message indicating zone switching to a second zone supporting an advanced mode at the ABS to the MS through the first zone, performing mapping of security association (SA) in the second zone with respect to the at least one service flow, and transmitting a second message including SA information indicating SA applied to at least one service flow in the second zone of the mapping result to the MS through the second zone.

At this time, with respect to each of the at least one service flow, any one of an SAID 0 with null SA and an SAID 1 for protecting confidentiality and integrity may be applied in the legacy mode, and any one of the SAID 0, the SAID 1 and an SAID 2 for protecting confidentiality may be applied in the advanced mode.

The SA information may include a bitmap indicating to which of the at least one service flow the SAID 2 is applied.

The mapping may be performed in consideration of at least one of SA in the first zone of the at least one service flow, management connection or unicast connection.

In another aspect of the present invention, there is provided a mobile station (MS) for performing zone switching in a broadband radio access system, the MS including a processor, and a radio frequency (RF) module configured to transmit and receive an RF signal to and from an external device under control of the processor, wherein, if a first message indicating zone switching to a second zone supporting an advanced mode at a base station (BS) is received from a first zone after at least one service flow is generated in the first region supporting a legacy mode of the BS, the processor receives, from the second zone, a second message including security association (SA) information indicating security association applied to the at least one service flow in the second zone so as to perform zone switching.

At this time, with respect to each of the at least one service flow, any one of an SAID 0 with null SA and an SAID 1 for protecting confidentiality and integrity may be applied in the legacy mode, and any one of the SAID 0, the SAID 1 and an SAID 2 for protecting confidentiality may be applied in the advanced mode.

The SA information may include a bitmap indicating to which of the at least one service flow the SAID 2 is applied.

The processor may apply SA to the at least one service flow according to the SA information and a predetermined SA mapping rule so as to perform data exchange with the second zone, and the predetermined SA mapping rule may set mapping of the SAID 0 or the SAID 1 in the second zone in consideration of at least one of SA in the first zone of the at least one service flow, management connection or unicast connection.

The first zone may be an LZone and the second zone may be an MZone, the first message may be a unsolicited ranging response (RNG-RSP) message transmitted from the LZone, and the second message may be a ranging response (AAI-RNG-RSP) message transmitted from the MZone.

Advantageous Effects

According to the embodiments of the present invention, the following effects are obtained.

First, according to the embodiments of the present invention, a mobile station (MS) can efficiently perform zone switching.

Second, according to the embodiments of the present invention, it is possible to define a method of deciding security association to be applied to each service flow in a switched zone upon zone switching of an MS.

The effects of the present invention are not limited to the above-described effects and other effects which are not described herein will become apparent to those skilled in the art from the following description.

DESCRIPTION OF DRAWINGS

FIG. 5 is a block diagram showing an example of the structure of a transmitter and a receiver according to another embodiment of the present invention.

BEST MODE

Figure 1:
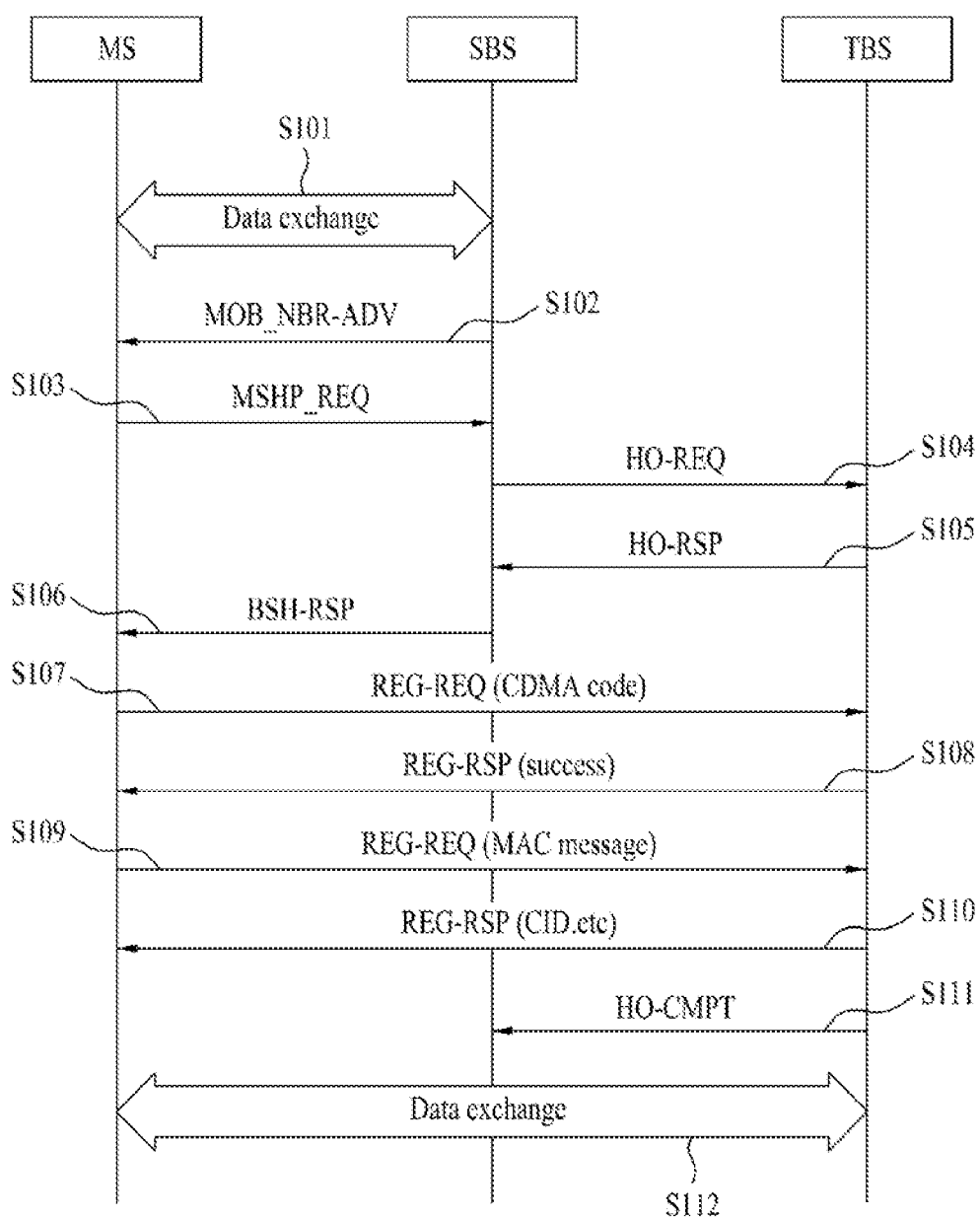
FIG. 1 is a diagram showing an example of a handover procedure which may be performed in an IEEE 802.16e system.

In order to solve the above problems, the present invention discloses a preferred context mapping method when an advanced mobile station (AMS) performs zone switching.

The following embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the mobile terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with the terms fixed station, Node-B, eNode-B (eNB) or access point (AP) as necessary. The term "terminal" may also be replaced with the terms user equipment (UE), mobile station (MS), mobile subscriber station (MSS) or subscriber station (SS) as necessary.

The embodiments of the present invention may be implemented by various parts. For example, the embodiments of the present invention may be implemented by hardware, firmware, software or a combination thereof.

In the case of implementing the present invention by hardware, the present invention can be implemented via application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. For example, the software code may be stored in the memories so that it can be driven by the processors. The memory units are located inside or outside the processors, so that they can communicate with the aforementioned processors via a variety of well-known parts.

The embodiments of the present invention can be supported by the standard documents disclosed in any one of wireless access systems, such as an IEEE802 system, A $3^{rd}$ Generation Partnership Project (3GPP) system, a 3GPP Long Term Evolution (LTE) system, and a 3GPP2 system. That is, the steps or portions, which are not described in order to make the technical spirit of the present invention clear, may be supported by the above documents. In addition, all the terms disclosed in the present document may be described by the above standard documents. In particular, the embodiments of the present invention may be supported by at least one of P802.16-2004, P802.16e-2005 and P802.16Rev2 documents, which are the standard documents of the IEEE802.16 system.

It should be noted that specific terms disclosed in the present invention are proposed for convenience of description and better understanding of the present invention, and the use of these specific terms may be changed to another format within the technical scope or spirit of the present invention.

Hereinafter, zone switching procedures performed before mapping of a security association identifier according to the present invention will be described.

Figure 2:
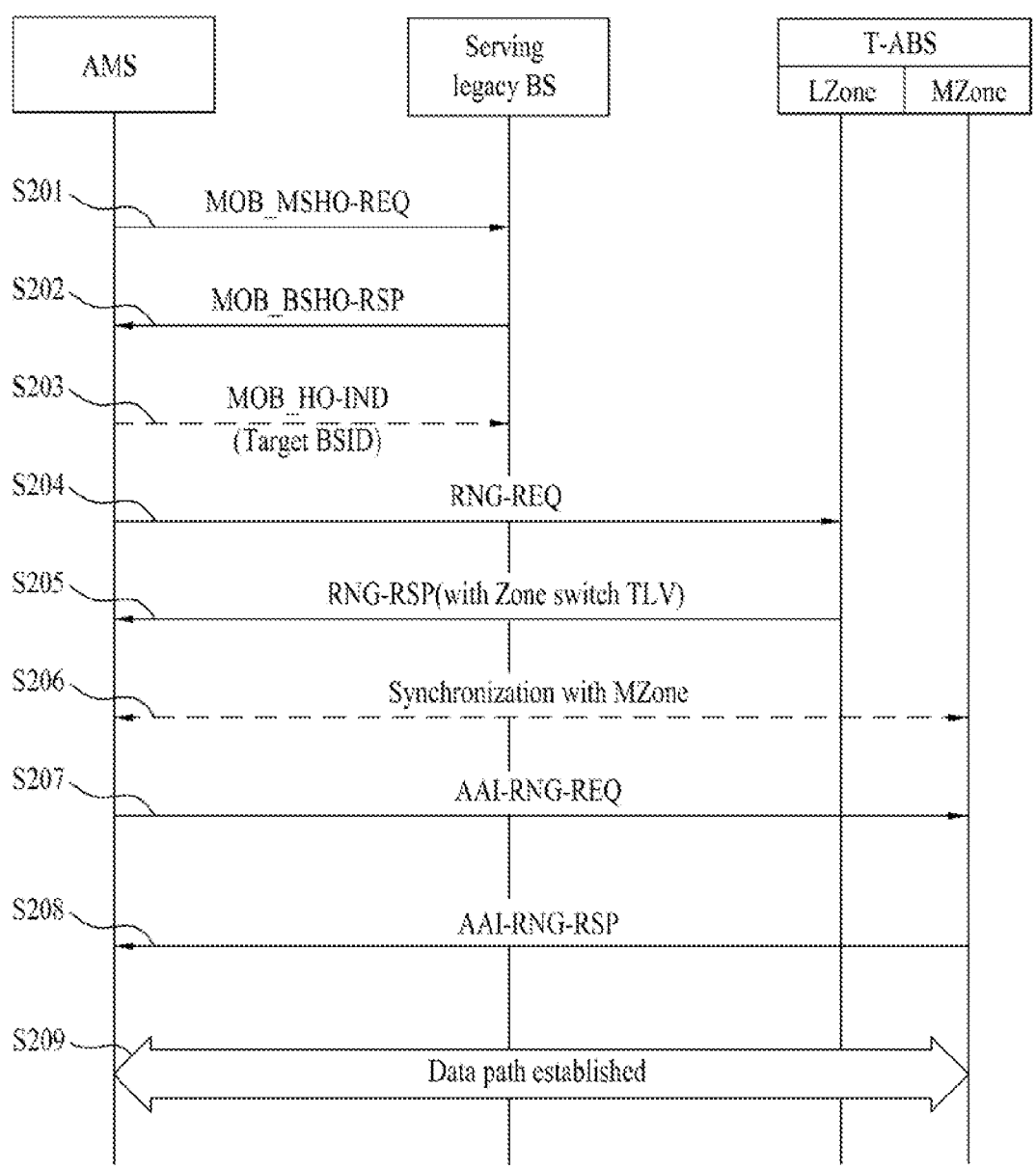
FIG. 2 is a diagram showing an example of a handover procedure using zone switching.

FIG. 2 is a diagram showing an example of a handover procedure through zone switching.

Referring to FIG. 2, an AMS may begin to scan candidate HO BSs using an HO trigger condition while communicating with a legacy serving BS. The AMS may transmit a handover request (MOB_MSHO-REQ) message and request the serving BS to perform a handover procedure, if a handover condition exceeds, for example, a predetermined hysteresis margin value (S201).

The serving BS may transmit information associated with handover acquired from the candidate HO BSs to the AMS through a handover response (MOB_BSHO-RSP) message. The MOB_BSHO-RSP message may include information for performing handover, such as an action time for performing handover, a handover identifier (HO-ID) and a dedicated HO CDMA ranging code (S202).

The AMS may set a legacy support ABS among candidate HO BSs as a target BS based on the information included in the MOB_BSHO-RSP message received from the serving BS. Then, the AMS may transmit a handover indication message to the serving legacy BS (S203).

Thereafter, the AMS transmits a ranging request (RNG-REQ) message to an LZone of the target BS (S204).

At this time, the ranging request message may include MAC version information of the AMS and the value thereof is set to a value corresponding to the AMS.

The BS may confirm that the MS which transmits the ranging message is an advanced MS (AMS) through the information acquired from the previous serving legacy BS or the MAC version information included in the ranging request message, and perform zone switching to an MZone.

For zone switching, the target BS transmits a ranging response (RNG-RSP) message including requested information (Zone switch TLV, hereinafter, referred to as "ZS TLV") to the AMS.

At this time, ZS TLV may include information shown in Table 1.

Table 1 shows an example of ZS TLV information included in the RNG-RSP message according to the present invention.

TABLE 1

| Name | Type (1 byte) | Length | Value |
|---|---|---|---|
| MZone preamble index | 41 | 2 | |
| Time offset | 42 | 1 | Time offset of the MZone and the LZone |
| Zone switch mode | 44 | 1 | Indicates whether data exchange is performed with the LZone during zone switching (0 = no data exchange/1 = data exchange) |
| Temporary station identifier | 46 | 1 | Temporary station identifier to be used in the MZone |
| Ranging initiation deadline | 47 | 1 | Deadline of temporary station identifier |

Referring to Table 1, ZS TLV may include MZone A-preamble index information, time offset information indicating a boundary (or a ratio) of an LZone and an MZone in a TDD frame structure, zone switch mode information indicating whether an MS maintains connection with an LZone in a zone switching procedure, temporary station identifier (STID) information for temporarily identifying an MS in an MZone, ranging initiation deadline information indicating a deadline of a temporary station identifier, etc. Although not shown in Table 1, a NONCE_ABS value for generating a primary master key (PMK) may be included.

Thereafter, the AMS performs synchronization with the MZone of the target ABS using information included in ZS TLV (S206) and requests uplink resources for transmitting a ranging request (AAI_RNG-REQ) message (BR request for AAI_RNG-REQ) (not shown) in order to perform zone switching.

If the requested uplink resources are allocated from the MZone, the AMS transmits a ranging request (AAI_RNG-REQ) message to the MZone (S207). At this time, the value of a ranging purpose indication field of the ranging request message is set to a value (e.g., 0b1010) indicating zone switching from the LZone to the MZone.

The target ABS transmits a ranging response (AAI_RNG-RSP) message to the AMS in response to the ranging request message transmitted by the AMS (S208).

Thereafter, the AMS may perform normal communication with the target ABS through the MZone after completing zone switching to the MZone (S209).

Although the AMS performs zone switching to the MZone without completing network reentry to the LZone of the target BS in the method described with reference to FIG. 2, the AMS may perform zone switching to the MZone after completing network reentry to the LZone, which will be described with reference to FIG. 3.

Figure 3:
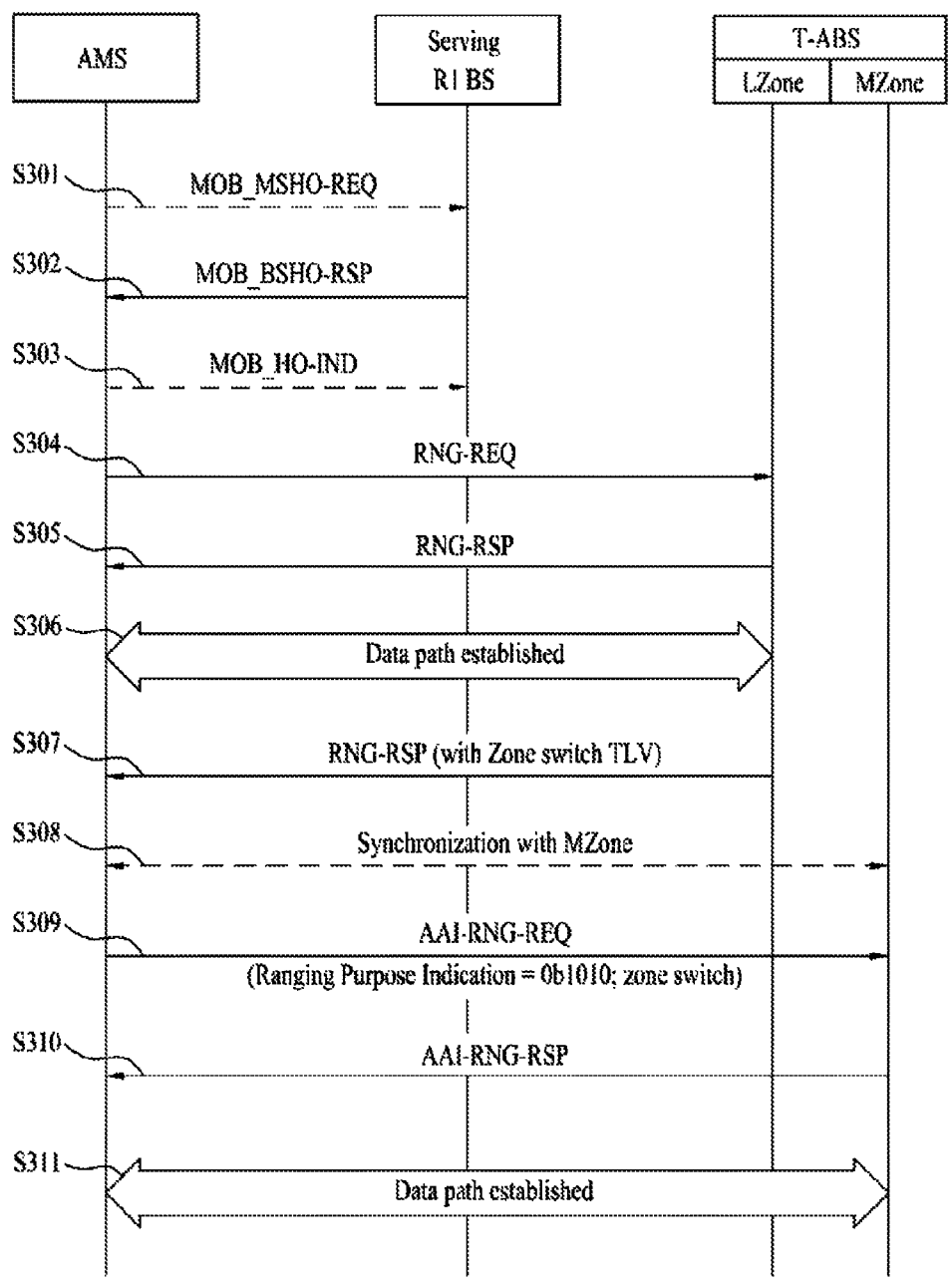
FIG. 3 is a diagram showing another example of a handover procedure using zone switching.

FIG. 3 is a diagram showing another example of a handover procedure using zone switching.

Steps S301 to S304 of FIG. 3 are similar to step S201 to S204 of FIG. 2 and thus a description thereof will be omitted for clarity.

The target BS which receives the RNG-REQ message from the AMS may confirm that the MS which transmits the ranging message is an advanced MS (AMS) through the information acquired from the previous serving legacy BS or the MAC version information included in the ranging request message, and perform zone switching to an MZone. However, the target BS may delay zone switching of the AMS due to load balancing between the LZone and the MZone.

Then, the target BS transmits a ranging response (RNG-RSP) message which does not include ZS TLV to the AMS (S305) and the AMS may perform normal communication after completing network reentry to the LZone of the target BS (S306).

Thereafter, if the target BS decides to instruct the AMS to perform zone switching to the MZone, the ranging response (RNG-RSP) message including ZS TLV may be transmitted to the AMS through unsolicited LZone (S307).

Then, the AMS performs synchronization with the MZone of the target ABS using information included in ZS TLV (S308) and requests uplink resources for transmitting a ranging request (AAI_RNG-REQ) message (BR request for AAI_RNG-REQ) (not shown) in order to perform zone switching.

If the requested uplink resources are allocated from the MZone, the AMS transmits a ranging request (AAI_RNG-REQ) message to the MZone (S309). At this time, the value of a ranging purpose indication field of the ranging request message is set to a value (e.g., 0b1010) indicating zone switching from the LZone to the MZone.

The target ABS transmits a ranging response (AAI_RNG-RSP) message to the AMS in response to the ranging request message transmitted by the AMS (S310).

Thereafter, the AMS may perform normal communication with the target ABS through the MZone after completing zone switching to the MZone (S311).

When the AMS performs zone switching from the LZone to the MZone through the process described with respect to FIGS. 2 and 3, in order to guarantee service continuity, context mapping of a service flow identifier and mapping of a security association identifier (SAID) should be performed. Context mapping and security association mapping are particularly of importance when a data path with the LZone is established so as to generate a service flow as in step S306 of FIG. 3. The service flow in the LZone may be performed through exchange of a dynamic service addition/response (DSA-REQ/RSP) message.

Security association means a set of information required for security communication between a BS and an MS (e.g., provision of a key material of a unicast transmission/control flow). Security association is shared between a BS and a client MS thereof and is identified using a security association identifier. In general, security association is individually applied to a unicast flow. If security association is mapped to a unicast transmission flow, security association is applied to all data exchanged in the unicast transmission flow. The same security association is mapped to a plurality of flows, and a receiver may be informed of information indicating whether a medium access control protocol data unit (MAC PDU) is encrypted through MAC header information. The structure of the MAC PDU is shown in FIG. 4.

Figure 4:
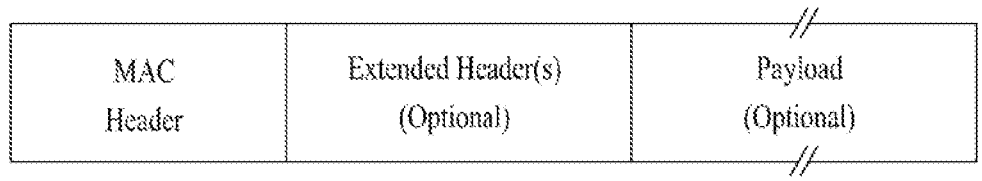
FIG. 4 is a diagram showing a general format of a medium access control protocol data unit (MAC PDU) used in an IEEE 802.16m system.

FIG. 4 is a diagram showing a general format of a medium access control protocol data unit (MAC PDU) used in an IEEE 802.16m system.

Referring to FIG. 4, the MAC PDU may include a MAC header, an extended header and a payload. At this time, the MAC header is always included in the MAC PDU and the payload may be optionally included. The extended header is not included in the MAC PDU if the payload is not included.

In general, context mapping of a service flow identifier of the LZone may be automatically performed such that a transport connection ID (CID) is mapped to a flow identifier (FID) in ascending order. However, since the type of a security association identifier (SAID) defined in the standard of the MZone and the type of an SAID defined in the standard of the LZone are different, the SAID may not be automatically mapped.

More specifically, an SA mapped to a CID in the LZone includes a null SA and a primary SA. The SAID of the null SA may be set to 0 (SAID=0x00) and the SAID of the primary SA may be set to 1 (SAID=0x01). An advanced encryption standard cipher block chaining mode (AES-CCM) with a cipher block chaining message authentication code (CBC-MAC) is applied to the primary SA.

The AES-CCM is an encryption mode obtained by combining a counter for integrity to a CBC-MAC mode for confidentiality, thereby achieving confidentiality and integrity. A MAC PDU using the AES-CCM is subjected to counter type encryption in a state in which a packet number (PN) is prefixed to the payload and an integrity check value (ICV) is postfixed to the payload.

In the SA in the MZone, an SAID 2 (SAID=0x02) is used in addition to the above-described two SAIDs of the LZone. The SAID 2 indicates an advanced encryption standard counter mode (AES-CTR). In the AES-CRT, data integrity of the AES-CCM is excluded and only confidentiality is protected.

The SAID 1 may be applied to a unicast control/transport flow, the SAID 2 may be applied to a transport flow only when a BS and an MS decide to generate an unprotected transport flow, and the SAID 0 may be applied to an unprotected transport flow.

Accordingly, it is necessary to map the SAID to the service flow identifier again upon zone switching due to a difference in SA between the MZone and the LZone.

SA Mapping Upon Zone Switching from LZone to MZone

In one embodiment of the present invention, in order to solve the above-described problems, when the MS performs zone switching from the LZone to the MZone, the BS explicitly informs the MS of information about SA mapping through the advanced ranging response (AAI-RNG-RSP) message.

As an example of the rule for mapping an SA mapped to a CID of the LZone to an SA of the MZone for implementing the present embodiment, the mapping rule shown in Table 2 is proposed.

TABLE 2

| CIDs in LZone | SA in MZone |
|---|---|
| Management connections | Null SA (SAID = 0x00), if only security suites with "No data encryption, no data authentication" is supported<br>Primary SA (SAID = 0x01), otherwise |
| Unicast transport CID with SA using AES-CCM | Primary SA (SAID = 0x01) |
| Unicast transport CID with Null SA | Null SA (SAID = 0x00) |
| Broadcast or multicast transport CID | Null SA (SAID-0x00) |

Referring to Table 2, the CDI for general management connections in the LZone and the unicast transport CID mapped to the SA with the AES-CCM may be mapped to the primary SA (SAID=0x01) in the MZone.

In addition, a CID for management connections with security suites with "No data encryption, no data authentication", a unicast CID with null SA and a broadcast or multicast transport CID in the LZone have null SA even in the MZone.

In Table 2, the SAID 0 and the SAID 1 are defined, but SAID 2 is not defined. Information about a service flow mapped to the SAID 2 is transmitted to the MS through a ranging response message. Information about the mapping result may be included in the ranging response message in the form of Table 3.

TABLE 3

| Name | Value | Usage |
|---|---|---|
| ... | ... | ... |
| Neighbor station measurement report indicator | Perform neighbor station measurement report if set to "1" | Identifies whether neighbor station measurement report is required during current network entry |
| Number of updated service flows (N SF update) | 4 | Number of service flows that require update |
| SAID update bitmap | 16 | Bitmap for indicating the specific service flows that are being mapped to SAID for AES-CTR |
| ... | ... | ... |

Table 3 shows an example of the format of the SA mapping information included in the ranging response message (AAI-RNG-RSP) in a zone switching procedure according to an embodiment of the present invention.

Referring to Table 3, the ranging response message may include a field (N_SF_update) indicating the number of updated service flows in the zone switching procedure and an SAID update bitmap field indicating a service flow mapped to an SAID for AES-CTR in the form of a bitmap. That is, information indicating whether service flows corresponding in number to the number indicated by the N_SF_update field are sequentially mapped to the SAID for AES-CTR may be indicated through the SAID update bitmap field.

The format of the ranging response message (AAI-RNG-RSP) including SAID mapping information is shown in Table 4.

TABLE 4

| Field | Size (bits) | Value/Description | Condition |
|---|---|---|---|
| ... | ... | ... | ... |
| SAID update bitmap | 16 | Bitmap for indicating the specific FID(s) that are being updated to SAID of AES-CTR | Shall be included if specific FDI(s) are to be remapped to SAID of AES-CTR in case of zone switch from LZone to MZone. |
| For (i = 0; i < N_SFIDs; i++){ | | N_SFIDs is number of SFIDs supported in MZone when an AMS performs zone switching from LZone to MZone. Its maximal number is 24. | Present if CID to FID mapping is done through the AAI-RNG-RSP message during zone switching operation. If this field is not present, all FIDs for the transport connection should be reestablished through the AAI-DSA exchanges after completion of network reentry in MZone |
| Service flow identifier (SFID) } | 32 | FID in MZone should be assigned per each DL/UL connection | |

Table 4 shows another example of the format of the ranging response message (AAI-RNG-RSP) including SAIP mapping information in a zone switching procedure according to an embodiment of the present invention.

Referring to Table 4, a SAID update bitmap field indicating a service flow mapped to an SAID of AES-CTR and a service flow identifier (SFID) field indicating a flow identifier (FID) allocated upon completing CID mapping in a zone switching procedure may be included. If SFID field is not included, the FID for transport connection is newly set through a dynamic service addition (AAI-DSA-REQ) message.

Tables 3 and 4 show part of information included in the ranging response message and more information may be included according to circumstances. The advanced ranging response message may correspond to step S208 of FIG. 2 or step S310 of FIG. 3.

The mapping result according to the rule of Table 2 may be transmitted to the MS in a state of being included in the ranging response message in the form of Table 3 or 4. Thereafter, the MS applies SA to each flow according to the mapping result in exchange of data such as a MAC PDU with the BS such that the service of the LZone is provided even in the MZone while appropriately maintaining security.

Although the SAIDs 0 and 1 are mapped according to the predetermined rule and the BS explicitly informs the MS of the result of mapping the SAID 2 through the ranging response message in the above embodiment, all MSs are explicitly informed of the result of mapping the SAIDs 0 to 2.

SA Mapping Upon Zone Switching from MZone to LZone

Zone switching from the MZone to the LZone may be performed according to decision of the BS for the purpose of load balance. If the BS wishes to switch the MS from the MZone to the LZone, the BS may transmit a handover command message, in which a field indicating zone switching to the LZone for triggering is set, to the MS through unsolicited AAI-HO-CMD. The handover command message includes connection identifiers (CIDs), security parameters, capability information, etc., all of which will be used in the LZone.

Even in this case, it is necessary to map an SAID to a SFID upon zone switching again due to a difference in SA between the MZone and the LZone. In the present embodiment, SA mapping is implicitly performed according to a predetermined rule.

As an example of the rule for mapping an SA mapped to a FID of the MZone to an SA of the LZone for implementing the present embodiment, the mapping rule shown in Table 5 is proposed.

TABLE 5

| FIDs in MZone | SA in LZone |
|---|---|
| Transport FID associated with Primary SA (SAID = 0x01) | Primary SA using AES-CCM |
| FID associated with SAID = 0x02 | Primary SA using AES-CCM |
| FID associated with Null SA (SAID = 0x00) | Null SA using "No data encryption; no data authentication" |
| Broadcast or multicast transport FID | Null SA using "No data encryption; no data authentication" |

Referring to Table 5, a transport FID with an SAID of 1 and a FID with an SAID of 2 in the MZone are mapped to primary SA using AES-CCM in the LZone. A FID with null SA and a broadcast/multicast transport FID in the MZone have null SA even in the LZone.

The mapping result according to the rule of Table 5 may be implicitly applied to the MS and the BS upon zone switching. Thereafter, the MS applies SA to each flow according to the mapping result in exchange of data such as a MAC PDU with the BS such that the service of the MZone is provided even in the LZone while appropriately maintaining security.

The mapping result according to the above-described rule may be explicitly transmitted in a state of being included in the ranging response (RNG-RSP) message transmitted from the LZone to the MS or the handover command (AAI-HO-CMD) message for triggering zone switching in the MZone in the form similar to Table 3 or 4. At this time, each FID mapped to the SAID of AES-CTR may be indicated in a toggled format in the bitmap of Table 3 or 4.

MS and BS Structure

Hereinafter, an MS and a BS (FBS or MBS) in which the above-described embodiments of the present invention may be performed will be described as another embodiment of the present invention.

The MS operates as a transmitter in uplink and operates as a receiver in downlink. The BS may operate as a receiver in uplink and operate as a transmitter in downlink. That is, each of the MS and the BS may include a transmitter and a receiver for transmission of information or data.

The transmitter and the receiver may include a processor, a module, a portion and/or means for performing the embodiments of the present invention. In particular, the transmitter and the receiver may include a module (means) for encrypting a message, a module for decrypting an encrypted message, and an antenna for transmitting or receiving a message. An example of the transmitter and the receiver will be described with reference to FIG. 5.

FIG. 5 is a block diagram showing an example of the structure of a transmitter and a receiver according to another embodiment of the present invention.

Referring to FIG. 5, a left side shows the structure of the transmitter and a right side shows the structure of the receiver. The transmitter and the receiver may include antennas 5 and 10, processors 20 and 30, transmission (Tx) modules 40 and 50, reception (Rx) modules 60 and 70, and memories 80 and 90, respectively. These components may perform corresponding functions. Hereinafter, the components will be described in more detail.

The antennas 5 and 10 serve to transmit signals generated by the Tx modules 40 and 50 to an external device and receive and send external radio frequency signals to the Rx modules 60 and 70. The number of antennas may be two or more if a Multi-Input Multi-Output (MIMO) function is supported.

The antenna, the Tx module and the Rx module may configure a radio frequency (RF) module.

The processors 20 and 30 generally control the overall operations of the mobile terminal. In particular, a controller function for performing the above-described embodiments of the present invention, a MAC frame variable control function according to service characteristics and transmission environment, a handover function and an authentication and encryption function may be performed. More specifically, the processors 20 and 30 may perform overall control in order to perform handover through zone switching shown in FIGS. 2 and 3.

In particular, the processor of the AMS may acquire the mapping result according to the predetermined rule through the ranging response (AAI-RNG-RSP) message transmitted from the BS when performing zone switching from the LZone to the MZone. Thereafter, the processor of the MS may apply SA to each flow according to the mapping result in exchange of data such as a MAC PDU with the BS such that the service of the LZone is provided even in the MZone while appropriately maintaining security.

The processor of the MS may perform an overall control operation of the procedure described in the above-described embodiments.

The Tx modules 40 and 50 perform coding and modulation with respect to data which is scheduled by the processors 20 and 30 and is transmitted to external devices and send the coded and modulated data to the antenna 10.

The Rx modules 60 and 70 may perform decoding and demodulation with respect to RF signals received from external devices through the antennas 5 and 10 and send the decoded and demodulated data to the processors 20 and 30 in the form of original data.

The memories 80 and 90 may store programs for processing and controlling the processors 20 and 30 and perform a function for temporarily storing input/output data. In addition, the memories 80 and 90 may include at least one of storage mediums such as a flash memory type, hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc.

Meanwhile, the BS may perform a controller function for performing the above-described embodiments of the present invention, Orthogonal Frequency Division Multiple Access (OFDMA) packet scheduling, Time Division Duplex (TDD) packet scheduling and a channel multiplexing function, an MAC frame variable control function according to service characteristics and transmission environment, a high-speed traffic real-time control function, a handover function, an authentication and encryption function, a packet modulation/demodulation function for data transmission, a high-speed packet channel coding function and a real-time modem control function using at least one of the above-described modules, or further include separate means, modules or portions for performing such functions.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. Moreover, it will be apparent that some claims referring to specific claims may be combined with another claims referring to the other claims other than the specific claims to constitute the embodiment or add new claims by means of amendment after the application is filed.

INDUSTRIAL APPLICABILITY

Although an example of applying an efficient zone switching procedure and an MS structure in a broadband radio access system to the IEEE 802.16m system is described in the above description, the present invention is applicable to various mobile communication systems such as 3GPP/3GPP2 in addition to the IEEE 802.xx system.

The invention claimed is:

1. A method of performing zone switch at a mobile station (MS) in a broadband radio access system, the method comprising:
   performing the zone switch from a first zone supporting a legacy mode of a base station (BS) to a second zone supporting an advanced mode of the BS,
   wherein the performing the zone switch includes receiving, from the second zone, a second message including security association (SA) information, the SA information indicating at least one second zone service flow that is mapped to at least one second zone SA, and
   wherein the at least one second zone SA that is mapped to the at least one second zone service flow is selected from a plurality of available second zone SAs based on a type of a first zone connection identifier corresponding to the second zone service flow, the first zone connection identifier being used in the first zone before performing the zone switch.

2. The method according to claim 1,
   wherein a plurality of available first zone SAs corresponds to any one of an SAID 0 with null SA and an SAID 1 for protecting confidentiality and integrity, and
   wherein the plurality of available second zone SAs corresponds to any one of the SAID 0, the SAID 1 and an SAID 2 for protecting confidentiality.

3. The method according to claim 1, wherein the SA information includes a bitmap indicating that an identifier of the second zone service flow is mapped to an identifier of the second zone SA.

4. The method according to claim 1, further comprising
   mapping the selected at least one second zone SA to the first zone connection identifier according to a predetermined SA mapping rule, wherein the type of the first zone connection identifier is one of a management connection, a broadcast connection, a multicast connection or a unicast connection.

5. The method according to claim 1, further comprising:
receiving, from the first zone, a first message including zone switch information required for the zone switch,
wherein the first zone is an LZone and the second zone is an MZone, the first message is a unsolicited ranging response (RNG-RSP) message transmitted from the LZone, and the second message is a ranging response (AAI-RNG-RSP) message transmitted from the MZone.

6. A method of supporting zone switch of a mobile station (MS) at an advanced base station (ABS) supporting a legacy mode through a first zone in a broadband radio access system, the method comprising:
transmitting, to the MS through a second zone supporting an advanced mode of the ABS, a second message including security association (SA) information, the SA information indicating at least one second zone service flow that is mapped to at least one second zone SA,
wherein the at least one second zone SA that is mapped to the at least one second zone service flow is selected from a plurality of available second zone SAs based on a type of a first zone connection identifier corresponding to the second zone service flow, the first zone connection identifier being used in the first zone before the zone switch is performed.

7. The method according to claim 6,
wherein a plurality of available first zone SAs corresponds to any one of an SAID 0 with null SA and an SAID 1 for protecting confidentiality and integrity, and
wherein the plurality of available second zone SAs corresponds to any one of the SAID 0, the SAID 1 and an SAID 2 for protecting confidentiality.

8. The method according to claim 6, wherein the SA information includes a bitmap indicating that an identifier of the second zone service flow is mapped to an identifier of the second zone SA.

9. The method according to claim 6, further comprising:
mapping the selected at least one second zone SA to the first zone connection identifier according to a predetermined SA mapping rule,
wherein the type of the first zone connection identifier is one of a management connection, a broadcast connection, a multicast connection or a unicast connection.

10. The method according to claim 6, further comprising:
transmitting, to the MS through the first zone supporting, a first message including zone switch information required for the zone switch of the MS from the first zone to the second zone,
wherein the first zone is an LZone and the second zone is an MZone, the first message is a unsolicited ranging response (RNG-RSP) message transmitted from the LZone, and the second message is a ranging response (AAI-RNG-RSP) message transmitted from the MZone.

11. A mobile station (MS) for performing zone switch in a broadband radio access system, the MS comprising:
a processor configured to perform the zone switch from a first zone supporting a legacy mode of a base station (BS) to a second zone supporting an advanced mode of the BS; and
a radio frequency (RF) module configured to transmit and receive an RF signal to and from an external device under control of the processor,
wherein the processor controls the RF module to receive from the second zone, a second message including security association (SA) information, the SA information indicating at least one second zone service flow that is mapped to at least one second zone SA, and
wherein the at least one second zone SA that is mapped to the at least one second zone service flow is selected from a plurality of available second zone SAs based on a type of a first zone connection identifier corresponding to the second zone service flow, the first zone connection identifier being used in the first zone before performing the zone switch.

12. The MS according to claim 11,
wherein a plurality of available first zone SAs corresponds to any one of an SAID 0 with null SA and an SAID 1 for protecting confidentiality and integrity, and
wherein the plurality of available second zone SAs corresponds to any one of the SAID 0, the SAID 1 and an SAID 2 for protecting confidentiality.

13. The MS according to claim 11, wherein the SA information includes a bitmap indicating that an identifier of the second zone service flow is mapped to an identifier of the second zone SA.

14. The MS according to claim 11,
wherein the processor is further configured to map the selected at least one second zone SA to the first zone connection identifier according to a predetermined SA mapping rule, and
wherein the type of a first zone connection identifier is one of a management connection, a broadcast connection, a multicast connection or a unicast connection.

15. The MS according to claim 11,
wherein the processor controls the RF unit to receive, from the first zone, a first message including zone switch information required for the zone switch, and
wherein the first zone is an LZone and the second zone is an MZone, the first message is a unsolicited ranging response (RNG-RSP) message transmitted from the LZone, and the second message is a ranging response (AAI-RNG-RSP) message transmitted from the MZone.

* * * * *